United States Patent
Floman et al.

(10) Patent No.: US 9,223,707 B2
(45) Date of Patent: *Dec. 29, 2015

(54) MOBILE MEMORY CACHE READ OPTIMIZATION

(71) Applicant: Memory Technologies LLC, Los Vegas, NV (US)

(72) Inventors: Matti Floman, Kangasala (FI); Kimmo J. Mylly, Ylojarvi (FI)

(73) Assignee: Memory Technologies LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,527

(22) Filed: Sep. 6, 2013

(65) Prior Publication Data

US 2014/0006719 A1    Jan. 2, 2014

Related U.S. Application Data

(63) Continuation of application No. 13/179,689, filed on Jul. 11, 2011, now Pat. No. 8,560,778.

(51) Int. Cl.
*G06F 13/00* (2006.01)
*G06F 12/08* (2006.01)

(52) U.S. Cl.
CPC ......... *G06F 12/0862* (2013.01); *Y02B 60/1225* (2013.01)

(58) Field of Classification Search
None
See application file for complete search history.

(56) References Cited

U.S. PATENT DOCUMENTS

| 5,050,076 | A | | 9/1991 | Misaka |
|---|---|---|---|---|
| 5,778,436 | A | * | 7/1998 | Kedem et al. ................. 711/137 |
| 5,896,517 | A | * | 4/1999 | Wilson .......................... 712/207 |
| 5,948,095 | A | | 9/1999 | Arora et al. |
| 6,247,107 | B1 | | 6/2001 | Christie |
| 6,378,031 | B1 | | 4/2002 | Kuno et al. |
| 6,895,496 | B1 | | 5/2005 | Taniguchi et al. |
| 7,181,574 | B1 | | 2/2007 | Lele |
| 7,822,731 | B1 | * | 10/2010 | Yu et al. ........................ 707/705 |
| 2002/0002658 | A1 | * | 1/2002 | Okayasu ....................... 711/137 |
| 2002/0007484 | A1 | | 1/2002 | Tirumalai et al. |
| 2002/0057708 | A1 | * | 5/2002 | Galbi et al. ................... 370/429 |
| 2005/0188121 | A1 | * | 8/2005 | Cho .............................. 710/22 |

(Continued)

FOREIGN PATENT DOCUMENTS

| KR | 20090007084 | 1/2009 |
|---|---|---|
| WO | WO2007138585 | 12/2007 |

OTHER PUBLICATIONS

"Embedded MultiMediaCard (eMMC) eMMC/Card Product Standard, High Capacity, including Reliable Write, Boot, Sleep Modes, Dual Data Rate, Multiple Partitions Supports, Security Enhancement, Background Operation and High Priority Interrupt (MMCA, 4.41)," JEDEC Standard, JESD84-A441, Mar. 2010, 233 pages.

(Continued)

*Primary Examiner* — Sean D Rossiter
(74) *Attorney, Agent, or Firm* — Lee & Hayes, PLLC

(57) ABSTRACT

Examples of enabling cache read optimization for mobile memory devices are described. One or more access commands may be received, from a host, at a memory device. The one or more access commands may instruct the memory device to access at least two data blocks. The memory device may generate pre-fetch information for the at least two data blocks based at least in part on an order of accessing the at least two data blocks.

22 Claims, 4 Drawing Sheets

(56) References Cited

U.S. PATENT DOCUMENTS

| | | | |
|---|---|---|---|
| 2006/0031635 A1 | 2/2006 | Zohar et al. | |
| 2006/0072562 A1* | 4/2006 | King | 370/389 |
| 2006/0112232 A1 | 5/2006 | Zohar et al. | |
| 2007/0067698 A1* | 3/2007 | King et al. | 714/763 |
| 2008/0127131 A1 | 5/2008 | Gao et al. | |
| 2009/0019260 A1* | 1/2009 | Park et al. | 712/207 |
| 2009/0198904 A1 | 8/2009 | Arimilli et al. | |
| 2009/0222629 A1 | 9/2009 | Yano et al. | |
| 2010/0082890 A1 | 4/2010 | Heo et al. | |
| 2011/0119426 A1* | 5/2011 | Boyle et al. | 711/3 |
| 2011/0264860 A1 | 10/2011 | Hooker et al. | |
| 2012/0166733 A1* | 6/2012 | Cherukuri et al. | 711/137 |

OTHER PUBLICATIONS

Final Office Action for U.S. Appl. No. 13/179,689, mailed on May 14, 2013, Matti Floman et al., "Mobile Memory Cache Read Optimization," 15 pages.

"Universal Flash Storage (UFS)," JEDEC Standard, JESD220, Feb. 2011, 257 pages.

"Why Raw NAND Flash with Hardware-based ECC is the Way to Go," retrieved at <<http://blog.datalight.com/why-raw-nand-flash-with-hardware-based-ecc-is-the-way-to-go>>, Apr. 14, 2011, 3 pages.

Supplementary European Search Report mailed Mar. 4, 2015 for European patent application No. 12811004.6, 7 pages.

\* cited by examiner

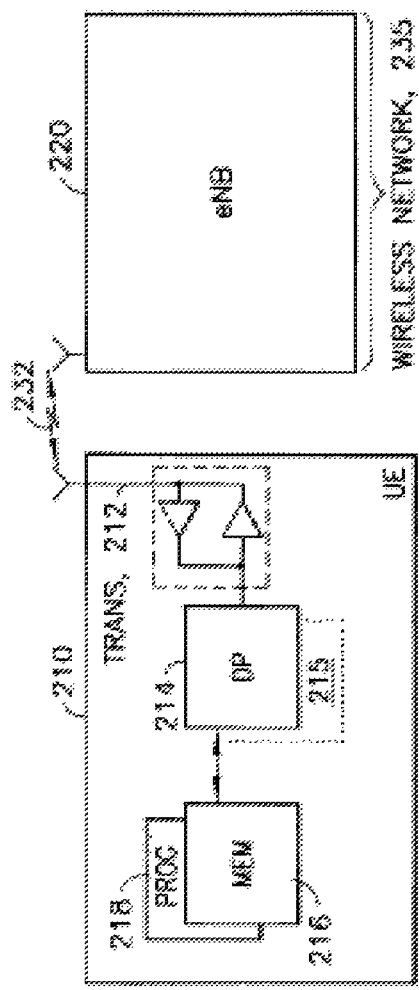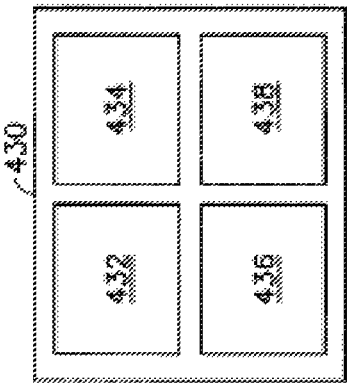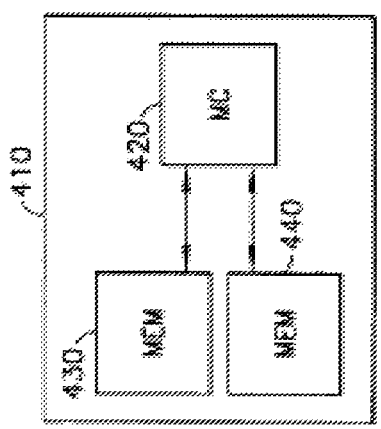

MOBILE MEMORY CACHE READ OPTIMIZATION

RELATED APPLICATION

This application is a continuation of and claims priority to U.S. patent application Ser. No. 13/179,689, filed on Jul. 11, 2011, the disclosure of which is incorporated by reference herein.

TECHNICAL FIELD

The exemplary and non-limiting embodiments of this invention relate generally to memory devices and, more specifically, relate to providing cache read optimization for mobile memory devices.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

DB database
DRAM dynamic random access memory
ECC error correction code
e-MMC embedded MultiMediaCard
eNB E-UTRAN Node B (evolved Node B)
FW firmware
HW hardware
Node B base station
OS operating system
PC personal computer
SBC(-3) SCSI block commands
SCSI small computer system interface
SSD solid state disc
SW software
UE user equipment, such as a mobile station or mobile terminal
UFS universal flash storage Mobile devices, such as UEs, may use memory for storing user data, for example, music, pictures, applications, maps, etc. The amount of user data stored in mobile devices is increasing and will continue to grow. Some high-end devices provide user data storage based on non-volatile memory such as NAND memory technology (also known as flash memory). NAND memory usage has expanded to mid-range devices.

In typical mobile managed NAND devices no actual cache memory exists due to cost and power optimizations. There may be some memory controller SRAM and a buffer memory in the NAND itself. However, these are temporary storages to buffer the data before it is programmed into NAND memory or delivered to the host. In some PC markets, managed NAND devices, like SSDs, may have cache memory storage, typically DRAM, included in the memory device. In SSD, the data may be stored to a DRAM cache for longer periods of time before flushing it to the NAND storage.

The standardized cache definitions and improvement of performance apply mainly for write operations. The existing standardized pre-fetch/packed command mechanisms are based on the host knowing which data should be fetched next in order to provide the address to the device in advance. However, this is not always the case.

What is needed is a way to improve memory reads in NAND memory devices.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for enabling cache read optimization for mobile memory devices. The method includes receiving (e.g., at a processor) one or more access commands, at a memory device from a host, the one or more access commands instructing the memory device to access at least two data blocks. Accessing the at least two data blocks is also included. The method includes generating, by the memory device, pre-fetch information for the at least two data blocks based at least in part on an order of accessing the at least two data blocks.

In a further aspect thereof an exemplary embodiment of this invention provides an apparatus for enabling cache read optimization for mobile memory devices. The apparatus includes one or more processors; and one or more memories including computer program code, the one or more memories and the computer program code configured to, with the one or more processors, cause the apparatus to perform actions. The actions include to receive one or more access commands, at a memory device from a host, the one or more access commands instructing the memory device to access at least two data blocks. The at least two data blocks are accessed. The actions also include to generate, by the memory device, pre-fetch information for the at least two data blocks based at least in part on an order of accessing the at least two data blocks.

In another aspect thereof an exemplary embodiment of this invention provides a computer readable medium for enabling cache read optimization for mobile memory devices. The computer readable medium is tangibly encoded with a computer program executable by a processor to perform actions. The actions include receiving one or more access commands, at a memory device from a host, the one or more access commands instructing the memory device to access at least two data blocks. The at least two data blocks are accessed. The actions also include generating, by the memory device, pre-fetch information for the at least two data blocks based at least in part on an order of accessing the at least two data blocks.

In a further aspect thereof an exemplary embodiment of this invention provides an apparatus for enabling cache read optimization for mobile memory devices. The apparatus includes means for receiving one or more access commands, at a memory device from a host, the one or more access commands instructing the memory device to access at least two data blocks; means for accessing the at least two data blocks; and means for generating, by the memory device, pre-fetch information for the at least two data blocks based at least in part on an order of accessing the at least two data blocks.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1 shows a simplified block diagram of exemplary electronic devices that are suitable for use in practicing various exemplary embodiments of this invention.

FIG. 3 shows a more particularized block diagram of an exemplary memory device such as that shown at FIGS. 1 and 2.

FIG. 4 shows a more particularized block diagram of an exemplary memory unit as that shown at FIG. 3.

DETAILED DESCRIPTION

Figure 2:
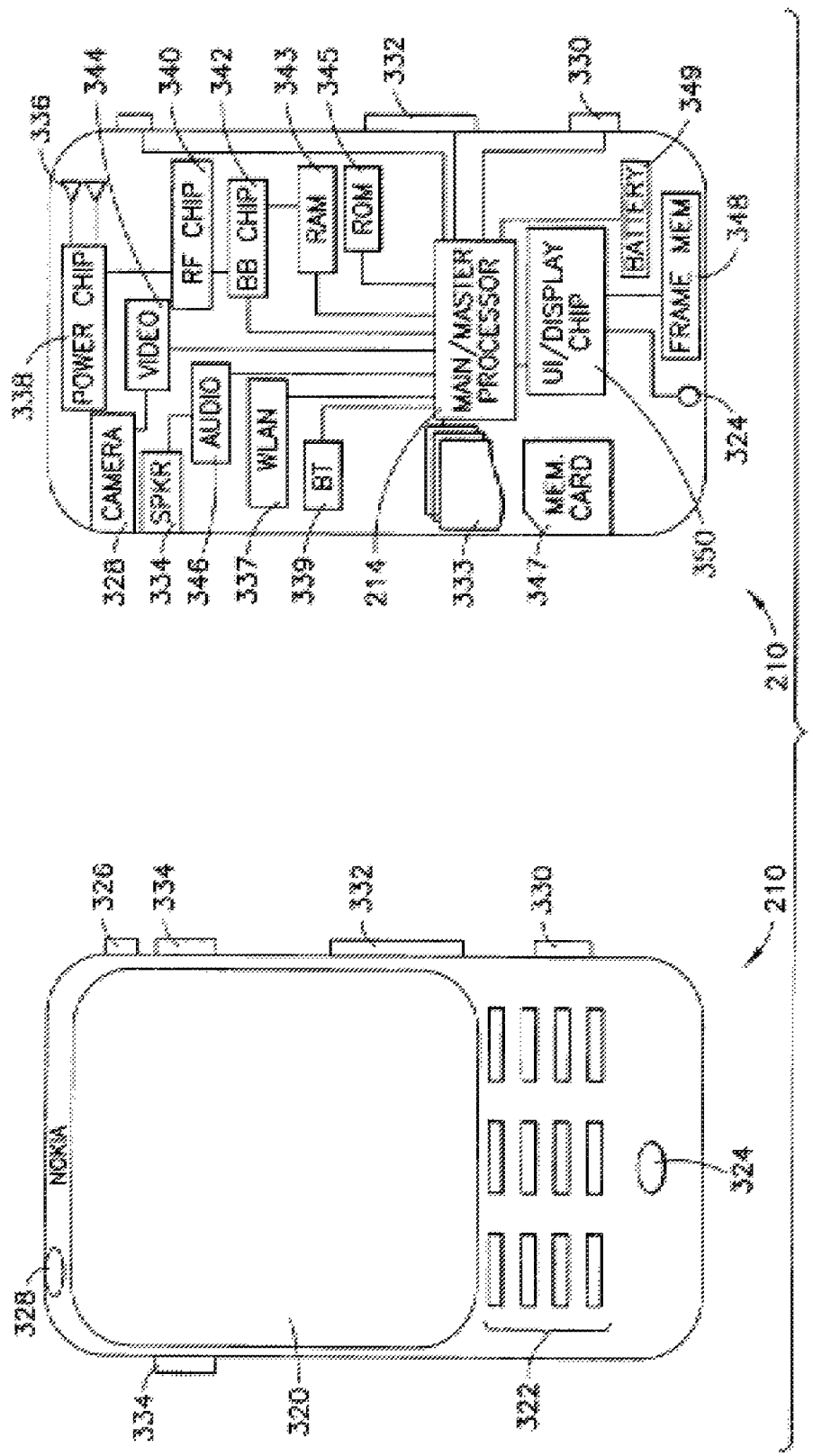
FIG. 2 shows a more particularized block diagram of an exemplary user equipment such as that shown at FIG. 1.

As NAND read access time may be on the scale of tens of microseconds, it would be advantageous that the next data could be fetched at least to the buffers of the NAND device or to a controller's buffers/cache with error correction code (ECC) corrected, in advance to a request for the data so that when host requests the next data it could be delivered from the cache. This could increase the average speed of read operations without burdening the host processors. Additionally, as the access requests are served more quickly, the memory module can be put to low power state sooner providing a measure of power consumption optimization. Additionally, the linking of data may be improved in order to ensure the correct data is fetched.

Before describing in further detail various exemplary embodiments of this invention, reference is made to FIG. 1 for illustrating a simplified block diagram of various electronic devices and apparatus that are suitable for use in practicing exemplary embodiments of this invention.

In the wireless system 230 of FIG. 1, a wireless network 235 is adapted for communication over a wireless link 232 with an apparatus, such as a mobile communication device which may be referred to as a UE 210, via a network access node, such as a Node B (base station), and more specifically an eNB 220.

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas. The UE 210 may also include one or more dedicated processors, for example memory processor 215.

The PROGs 218 is assumed to include program instructions that, when executed by the associated DP 214, enable the device to operate in accordance with exemplary embodiments of this invention, as will be discussed below in greater detail.

That is, various exemplary embodiments of this invention may be implemented at least in part by computer software executable by the DP 214 of the UE 210, or by hardware, or by a combination of software and hardware (and firmware).

In general, the various embodiments of the UE 210 can include, but are not limited to, cellular telephones, personal digital assistants (PDAs) having wireless communication capabilities, portable computers having wireless communication capabilities, image capture devices such as digital cameras, gaming devices, music storage and playback appliances, Internet appliances permitting wireless Internet access and browsing, as well as portable units or terminals that incorporate combinations of such functions.

The computer readable MEM 216 may be of any type suitable to the local technical environment and may be implemented using any suitable data storage technology, such as semiconductor based memory devices, flash memory, magnetic memory devices and systems, optical memory devices and systems, fixed memory and removable memory. The DP 214 may be of any type suitable to the local technical environment, and may include one or more of general purpose computers, special purpose computers, microprocessors, digital signal processors (DSPs) and processors based on a multicore processor architecture, as non-limiting examples. The wireless interface (e.g., RF transceiver 212) may be of any type suitable to the local technical environment and may be implemented using any suitable communication technology such as individual transmitters, receivers, transceivers or a combination of such components.

FIG. 2 illustrates further detail of an exemplary UE in both plan view (left) and sectional view (right), and the invention may be embodied in one or some combination of those more function-specific components. At FIG. 2 the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (e.g., for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 2 are seen multiple transmit/receive antennas 336 that are typically used for cellular communication. The antennas 336 may be multi-band for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 may be stored in one or more of flash 333, e.g., NAND, eMMC, UFS, SSD, etc. All of these components within the UE 210 are normally powered by a portable power supply such as a battery 349.

Processors 338, 340, 342, 344, 346, 350, if embodied as separate entities in a UE 210, may operate in a slave relationship to the main processor 214, which may then be in a master relationship to them. Embodiments of this invention are most relevant to the controllers of the memory modules (333, 343, 345, 347, 348), though it is noted that other embodiments need not be disposed there but may be disposed across various chips and memories as shown or disposed within another processor that combines some of the functions described above for FIG. 2. Any or all of these various processors of FIG. 2 access one or more of the various memories, which may be on-chip with the processor or separate therefrom.

Note that the various chips (e.g., 338, 340, 342, etc.) that were described above may be combined into a fewer number than described and, in a most compact case, may all be embodied physically within a single chip.

FIG. 3 shows a more particularized block diagram of an exemplary memory device such as that shown at FIGS. 1 and 2, e.g., MEM 216, RAM 343, ROM 345, flash 333 and memory card 347. MEM 410 includes a memory controller (MC) 420 and, as shown, two individual memory units MEM 430 and MEM 440. In another exemplary embodiment, there may be one or more memory units. MC 420 is configured to handle read/write requests and send instructions to MEM 430 and MEM 440 accordingly.

MEM 430 and MEM 440 may be the same type of memory device (e.g., both using NAND memory technology) or they may be of different types (e.g., MEM 430 may use NAND memory technology and 440 may be an optical drive memory technology). Additionally, one or more of the memory units (MEM 430, 440) may be used as a local cache memory for the MC 420.

FIG. 4 shows a more particularized block diagram of an exemplary memory unit as that shown at FIG. 3. MEM 430 is divided into various memory regions (432, 434, 436 and 438). Four regions are shown as a non-limiting illustration; however, there can be any number of regions (e.g., 1, 2, 4, 8, etc.).

The separation of the regions may be physical or a virtual/logical separation. A virtual separation may be performed by assigning various memory addresses to a region. The cells in a region may or may not be physically contiguous. Each region may be treated separately by the MC 420 or combined into a single entity.

As a non-limiting example, the MEM 430 may be separated into a large number of regions each representing a page of memory or a block of memory (e.g., a block of 512 bytes).

In a first exemplary embodiment in accordance with this invention, the pre-fetch/caching is tied to an index identifier (e.g., the ContextID feature of eMMC). Whenever the host writes to an index identifier (e.g., index #1), the data written in the corresponding NAND block may include a link to the next index #1 data. This way, the host could operate as though writing data (e.g., software (SW), picture/music data or database information) into a single index and, when reading the data (e.g., even using several sequential or single block read accesses), the next data may be pre-fetched without additional host effort. In one non-limiting example, the data TAG concept of eMMC or Group Number scheme of SCSI SBC-3 may be used tying the data together for optimized read caching.

If the host later writes new data into the memory, it could use the same index used earlier (e.g. in production for writing the OS). In order to support a limited number of dynamic indices, every time a new index is opened only the latest data for that index will be linked together. Thus, any intervening write command could prevent a pre-fetch link between write commands with the same index as these indices may or may not correspond to the same data.

Alternatively, the index could be also fixed so that if new data is later written to an index which was closed earlier (e.g., the index is re-opened) then this new data would be linked to the end of the previous write. Indices may be fixed for an unlimited time, or may be fixed temporarily (e.g., for a period of time, until the system is idle for a predetermined amount of time, in response to command, etc.).

A linking session may represent when data from write commands having the same index information are linked. A new session is started when a previously used index is used but blocks from the previous use are not to be linked to the new blocks (e.g., the last block of the previous use is not linked to the first block of the new use).

Additionally, a linking session may be ended due to any one of a number of situations:
1) after a period of time from the initial starting of the linking session (e.g., a limited window),
2) after a period of time from the last access operation (e.g., a timeout after an idle period),
3) based on a state of the memory device (e.g. in eMMC: transfer state or standby state, in UFS: linked to power modes or active LUs, etc.) or
4) a control register which changes the behavior in a host controlled technique.

In a memory device driven embodiment, the host does not need to utilize any tags or indices, rather, the memory device controls the pre-fetch. In a first example, the memory device enforces pre-fetch of a next logical data or physical address data to buffers/cache. This would be efficient with data that was written into sequential (logical) addresses with a 'write multiple block' command (e.g., the Write_Multiple_Blocks command of eMMC). The device could also link such data together for read pre-fetch.

Alternatively, the last address of a previous write multiple block command could be tied to a first address of the next write multiple block command under the assumption that they belong to the same sequential file (e.g., megabytes of a data/file are typically cut into smaller pieces for writing).

In a further exemplary embodiment in accordance with this invention, the memory device may link similar "random" accesses together. For example, where the file system of the media is very fragmented and data is written in very small pieces (small allocation unit granularity) throughout the memory media.

The memory device may determine linkages during the usage of data (for example, where the host interaction is limited). Where the memory device links two consecutive write accesses (e.g., to blocks A and B), the blocks may actually belong to different files/entities, thus, creating a "cache miss" when subsequently pre-fetched. These incorrect linkages could be detected during use, for example, where the memory device detects that after a last address of A there is no subsequent reading of the first address of B indicating that the link between A and B may be removed.

Additionally, if the memory device determines that after the last address of A is accessed the first address of C is read then this link could be built during runtime.

In a further exemplary embodiment, more than one potential next address may be pre-fetched to the cache. For example, if there is no clear idea which data would be most advantageous to be pre-fetched if the subsequent accesses change regularly according to some rule which may not be known by the memory device.

Linkage information between a first block and a second block may be stored in a variety of ways. For example, the linkage information may be saved in the first block as a pointer to the second block. The second block may also store a pointer to the first block. Alternatively, the linkage information may be saved in a separate location, for example, as part of a list of linkages throughout the memory.

A block may also record linkage information indicating a plurality of blocks, for example, where a second block was written immediately after the first block and a third block is read following the first block or where subsequent read operations alternate between a limited set of blocks.

The linkage information may also include additional data. A count of each time a given block is read and no block is subsequently read within a given time may be used in order to determine when to break (or remove) a link to a subsequent block. A count for each block linked may also be kept representing the number of time that the specific block is subsequently read. This count may be used to determine which block(s) to pre-fetch, for example, when pre-fetching only one block, the block with the most subsequent reads may be used.

In some embodiments, the host may enable/disable linking addresses in the writing phase or in the reading phase (e.g., through explicit signaling) in order to optimize between access time vs. power. The pre-fetch operations may be enabled/disabled (e.g., by the host) or established by a fixed setting for either the whole media or per partition or logical unit.

The host may also instruct the memory device to cease pre-fetch operations, for example, by changing a bit flag in a message. In a non-limiting example, the bit flag is a abort pre-fetch (ABPF) bit.

Additionally, the host may instruct the memory device whether or not to link (or pre-fetch) data across physical memory devices. Thus, the memory device, in one setting, may link data blocks written to separate physical devices (e.g., two distinct NAND memories), and in a second setting, no linking information would be generated.

Figure 5:
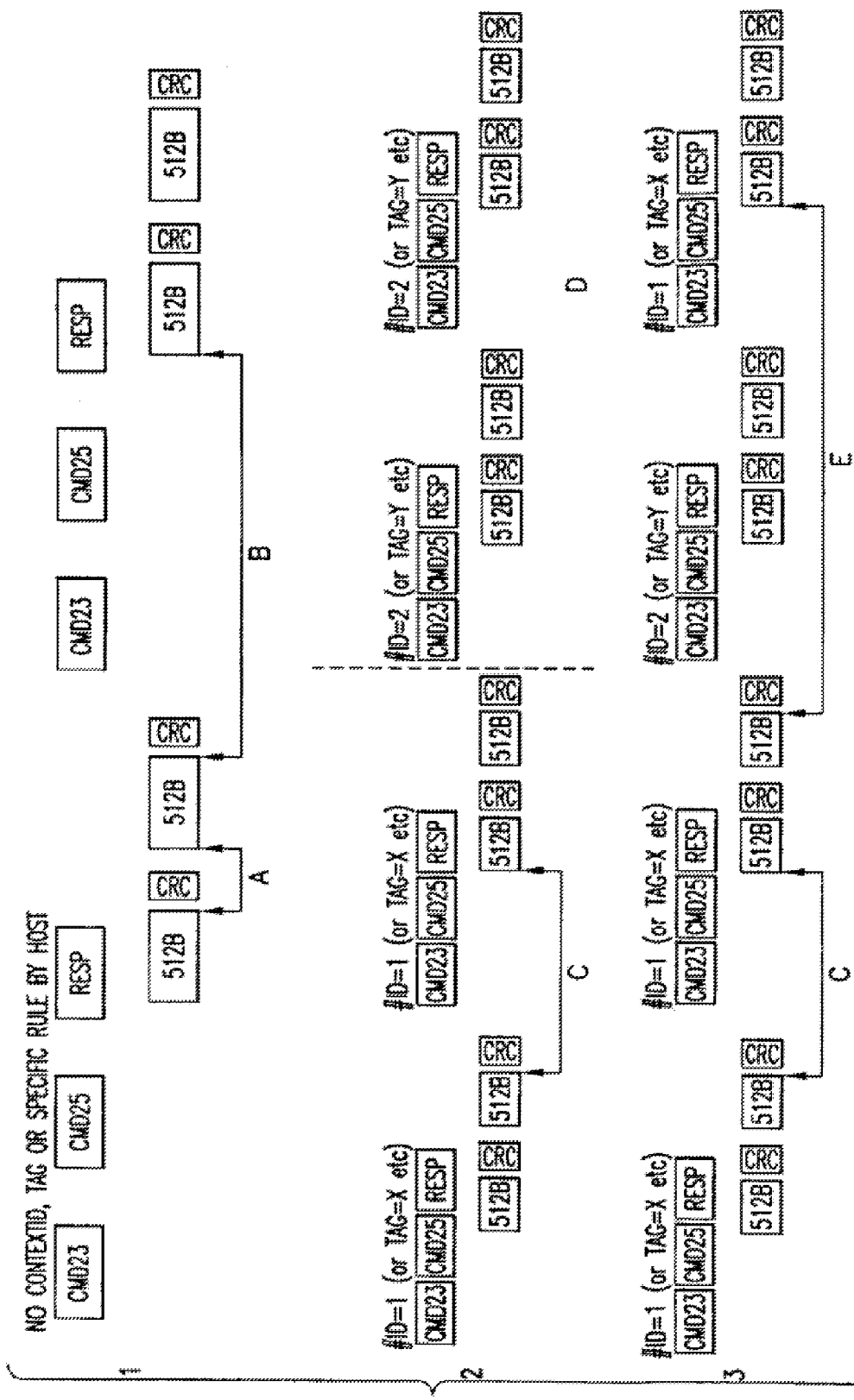
FIG. 5 illustrates exemplary memory write operations in accordance with this invention.

FIG. 5 illustrates exemplary memory write operations in accordance with this invention.

In a first example (1), the host issues a first write multiple blocks command (e.g., a combined CMD23 and CMD25) and the memory returns a response (RESP). In this scenario, no context ID, TAG or specific rule is provided by the host. The first write command instructs the memory to write two 512 byte blocks (or pages) into memory. The blocks may include a cyclic redundancy check (CRC) or a corresponding CRC may be written to another location. The write procedure creates a first indicator, A (a pre-fetch link), linking the most recently written block (the first block) to the second block. Similarly, when the host issues a second write command creating a third block, the memory device creates a second indicator, B, linking the most recently written block (the second block) to the third block.

In a second example (2), the host provides context IDs or TAGs. In the first portion, the first write command instructs the memory to write two 512 byte blocks (or pages) into memory using a first identifier (e.g., #ID=1, TAG=X, etc.). When the host issues a second write command using the same identifier, the memory device creates an indicator, C, linking the most recently written block with the same identifier (the second block) to the third block. In the second portion (to the right of the hashed line), each write command is a separate program session whether or not they share identifiers. As shown, when writing to an identifier (e.g., #ID=2, TAG=Y, etc.), an indicator, D, is omitted creating a break in the pre-fetch link due to the program session being closed.

In a third example (3), the host again provides context IDs or TAGs. As in example 2, an indicator, C, is created linking the most recently written block with the same identifier (the second block) to the third block. The procedure may create links between blocks even when other write commands with different identifiers (e.g., the third write command) are performed. Thus, when the host issues a fourth write command using the same identifier as the first two write commands, the memory device creates an indicator, E, linking the most recently written block with the same identifier (the fourth block) to the seventh block.

While not shown in examples 2 and 3, two blocks written in response to a single write command may (or may not) have indicators linking them. These indicators may differ from those linking blocks written by different write commands.

Based on the foregoing it should be apparent that the exemplary embodiments of this invention provide a method, apparatus and computer program(s) to provide cache read optimization for mobile memory devices.

Figure 6:
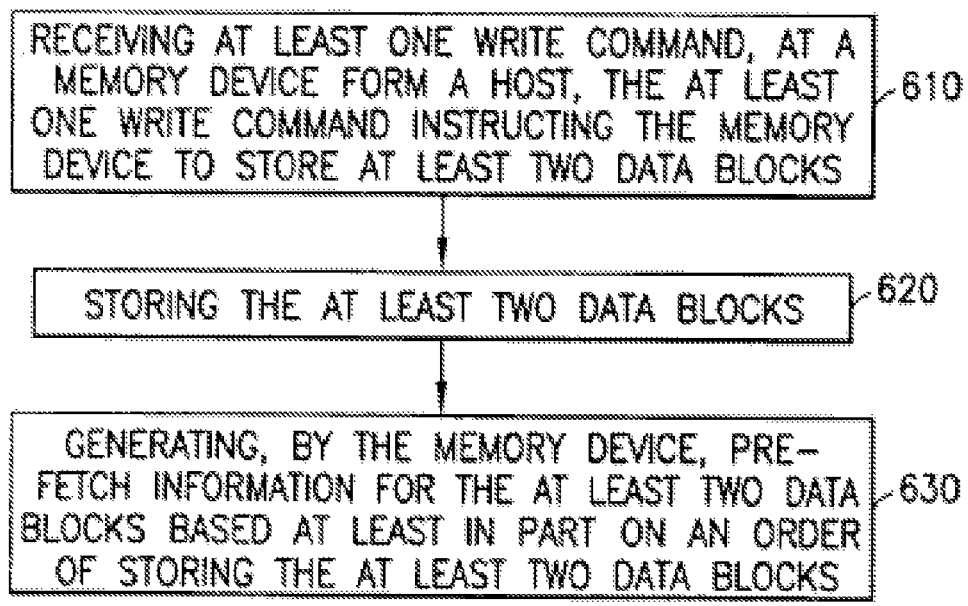
FIG. 6 is a logic flow diagram that illustrates the operation of an exemplary method, and a result of execution of computer program instructions embodied on a computer readable memory, in accordance with various exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 610, a step of receiving at least one write command, at a memory device form a host. The at least one write command instructs the memory device to store at least two data blocks. The at least two data blocks are stored at Block 620. At Block 630, the memory device generates pre-fetch information for the at least two data blocks based at least in part on an order of storing the at least two data blocks.

The various blocks shown in FIG. 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

In an exemplary embodiment in accordance with this invention, a method is provided for enabling cache read optimization for mobile memory devices. The method includes receiving (e.g., at a processor) one or more access commands, at a memory device from a host, the one or more access commands instructing the memory device to access at least two data blocks. Accessing (e.g., by a processor) the at least two data blocks is also included. The method includes generating (e.g., by a processor), by the memory device, pre-fetch information for the at least two data blocks based at least in part on an order of accessing the at least two data blocks.

In a further exemplary embodiment of the method above, generating the pre-fetch information is further based on information provided by the host, and/or rules in a controller for the memory device.

In another exemplary embodiment of any one of the methods above, each access command of the one or more access commands is associated with index information including a context identifier, a task tag, a pre-fetch identifier and/or a group number. The index information may be sent with the access command or in a separate message.

In a further exemplary embodiment of the method above, the one or more access commands include a first access command and a second access command. The first access command and the second access command include identical index information.

In another exemplary embodiment of the method above, receiving the one or more access commands include receiving a first access command at a first time including first index information, receiving a second access command at a second time after the first time, where the second access command includes second index information which differs from the first index information, and receiving a third access command at a third time after the second time including the first index information.

In a further exemplary embodiment of the method above, generating the pre-fetch information includes linking a last data block accessed in response to the first access command to a first data block accessed in response to the third access command.

In another exemplary embodiment of the method above, generating the pre-fetch information includes starting a new linking data session for a first data block accessed in response to the third access command. Data blocks accessed in response to access commands having the same index information are linked during a linking data session.

In a further exemplary embodiment of the method above, data blocks accessed in response to access commands having matching index information are linked during a linking data session, and the method also includes starting a new linking data session in response to an elapse of a predetermined time after a previous access commands having the matching index information, an elapse of time after the linking data session was started, or a change in a control register.

In another exemplary embodiment of any one of the methods above, generating the pre-fetch information includes linking a first data block of the at least two data blocks to a next subsequently accessed data block of the at least two data blocks.

In a further exemplary embodiment of any one of the methods above, the one or more access commands include a read command and/or a write command.

In another exemplary embodiment of any one of the methods above, the pre-fetch information includes instructions to pre-fetch at least two blocks when a first block is read.

In a further exemplary embodiment of any one of the methods above, the method also includes receiving a first read command instructing the memory device to provide a first read data block to the host; providing the first read data block to the host; determining a subsequent read data block based on the pre-fetch information; pre-fetching the subsequent read data block; after pre-fetching the subsequent read data block, receiving a second read command instructing the memory device to provide the subsequent read data block to the host; and providing the pre-fetched subsequent read data block to the host.

In another exemplary embodiment of the method above, the method also includes receiving a command to cease generating pre-fetch information for at least a portion of the memory device; and preventing generating pre-fetch information when accessing data blocks in the portion of the memory device.

In a further exemplary embodiment the method above, the method also includes receiving one or more additional access commands instructing the memory device to access one or more of the two or more data blocks; and removing the pre-fetch information based on an order of data blocks accessed in response to the one or more access commands.

In another exemplary embodiment of any one of the methods above, the memory device includes one or more NAND memory storage devices.

In another exemplary embodiment in accordance with this invention, an apparatus is provided for enabling cache read optimization for mobile memory devices. The apparatus includes one or more processors; and one or more memories including computer program code, the one or more memories and the computer program code configured to, with the one or more processors, cause the apparatus to perform actions. The actions include to receive one or more access commands, at a memory device from a host, the one or more access commands instructing the memory device to access at least two data blocks. The at least two data blocks are accessed. The actions also include to generate, by the memory device, pre-fetch information for the at least two data blocks based at least in part on an order of accessing the at least two data blocks.

In another exemplary embodiment of the apparatus above, generating the pre-fetch information is further based on information provided by the host, and/or rules in a controller for the memory device.

In a further exemplary embodiment of any one of the apparatus above, each access command of the one or more access commands is associated with index information including a context identifier, a task tag, a pre-fetch identifier and/or a group number.

In another exemplary embodiment of the apparatus above, the one or more access commands include a first access command and a second access command, and the first access command and the second access command include identical index information.

In a further exemplary embodiment of the apparatus above, when receiving the one or more access commands, the one or more memories and the computer program code are further configured to cause the apparatus to receive a first access command at a first time including first index information, to receive a second access command at a second time after the first time, where the second access command includes second index information which differs from the first index information, and to receive a third access command at a third time after the second time including the first index information.

In another exemplary embodiment of the apparatus above, when generating the pre-fetch information, the one or more memories and the computer program code are further configured to cause the apparatus to link last data block accessed in response to the first access command to a first data block accessed in response to the third access command.

In a further exemplary embodiment of the apparatus above, when generating the pre-fetch information, the one or more memories and the computer program code are further configured to cause the apparatus to start a new linking data session for a first data block accessed in response to the third access command. Data blocks accessed in response to access commands having the same index information are linked during a linking data session.

In another exemplary embodiment of the apparatus above, data blocks accessed in response to access commands having matching index information are linked during a linking data session, and the one or more memories and the computer program code are further configured to cause the apparatus to start a new linking data session in response to an elapse of a predetermined time after a previous access commands having the matching index information, an elapse of time after the linking data session was started, or a change in a control register.

In a further exemplary embodiment of any one of the apparatus above, when generating the pre-fetch information, the one or more memories and the computer program code are further configured to cause the apparatus to link a first data block of the at least two data blocks to a next subsequently accessed data block of the at least two data blocks.

In another exemplary embodiment of any one of the apparatus above, the one or more access commands include a read command and/or a write command.

In a further exemplary embodiment of any one of the apparatus above, the pre-fetch information include instructions to pre-fetch at least two blocks when a first block is read.

In another exemplary embodiment of any one of the apparatus above, the one or more memories and the computer program code are further configured to cause the apparatus to receive a first read command instructing the memory device to provide a first read data block to the host; to provide the first read data block to the host; to determine a subsequent read data block based on the pre-fetch information; to pre-fetch the subsequent read data block; after pre-fetching the subsequent read data block, to receive a second read command instructing the memory device to provide the subsequent read data block to the host; and to provide the pre-fetched subsequent read data block to the host.

In a further exemplary embodiment of the apparatus above, the one or more memories and the computer program code are further configured to cause the apparatus to receive a command to cease generating pre-fetch information for at least a portion of the memory device; and to prevent generating pre-fetch information when accessing data blocks in the portion of the memory device.

In another exemplary embodiment of any one of the apparatus above, the one or more memories and the computer program code are further configured to cause the apparatus to receive one or more additional access commands instructing the memory device to access one or more of the two or more data blocks; and to remove the pre-fetch information based on an order of data blocks accessed in response to the one or more access commands.

In a further exemplary embodiment of any one of the apparatus above, the apparatus is embodied in an integrated circuit.

In another exemplary embodiment in accordance with this invention, a computer readable medium is provided for enabling cache read optimization for mobile memory devices. The computer readable medium is tangibly encoded with a computer program executable by a processor to perform actions. The actions include receiving one or more access commands, at a memory device from a host, the one or more access commands instructing the memory device to access at least two data blocks. The at least two data blocks are accessed. The actions also include generating, by the memory device, pre-fetch information for the at least two data blocks based at least in part on an order of accessing the at least two data blocks.

In a further exemplary embodiment of the computer readable medium above, generating the pre-fetch information is further based on information provided by the host, and/or rules in a controller for the memory device.

In another exemplary embodiment of any one of the computer readable media above, each access command of the one or more access commands is associated with index information including a context identifier, a task tag, a pre-fetch identifier and/or a group number.

In a further exemplary embodiment of the computer readable medium above, the one or more access commands include a first access command and a second access command, and the first access command and the second access command include identical index information.

In another exemplary embodiment of the computer readable medium above, receiving the one or more access commands includes receiving a first access command at a first time including first index information, receiving a second access command at a second time after the first time, where the second access command includes second index information which differs from the first index information, and receiving a third access command at a third time after the second time including the first index information.

In a further exemplary embodiment of the computer readable medium above, generating the pre-fetch information includes linking a last data block accessed in response to the first access command to a first data block accessed in response to the third access command.

In another exemplary embodiment of the computer readable medium above, generating the pre-fetch information includes starting a new linking data session for a first data block accessed in response to the third access command. Data blocks accessed in response to access commands having the same index information are linked during a linking data session.

In a further exemplary embodiment of the computer readable medium above, data blocks accessed in response to access commands having matching index information are linked during a linking data session, and the actions further include starting a new linking data session in response to an elapse of a predetermined time after a previous access commands having the matching index information, an elapse of time after the linking data session was started, or a change in a control register.

In another exemplary embodiment of any one of the computer readable media above, where generating the pre-fetch information includes linking a first data block of the at least two data blocks to a next subsequently accessed data block of the at least two data blocks.

In a further exemplary embodiment of any one of the computer readable media above, the one or more access commands include a read command and/or a write command.

In another exemplary embodiment of any one of the computer readable media above, the pre-fetch information include instructions to pre-fetch at least two blocks when a first block is read.

In a further exemplary embodiment of any one of the computer readable media above, the actions further include receiving a first read command instructing the memory device to provide a first read data block to the host; providing the first read data block to the host; determining a subsequent read data block based on the pre-fetch information; pre-fetching the subsequent read data block; after pre-fetching the subsequent read data block, receiving a second read command instructing the memory device to provide the subsequent read data block to the host; and providing the pre-fetched subsequent read data block to the host.

In another exemplary embodiment of the computer readable medium above, the actions further include receiving a command to cease generating pre-fetch information for at least a portion of the memory device; and preventing generating pre-fetch information when accessing data blocks in the portion of the memory device.

In a further exemplary embodiment of the computer readable medium above, the actions further include receiving one or more additional access commands instructing the memory device to access one or more of the two or more data blocks; and removing the pre-fetch information based on an order of data blocks accessed in response to the one or more access commands.

In another exemplary embodiment of any one of the computer readable media above, the memory device includes one or more NAND memory storage devices.

In a further exemplary embodiment of any one of the computer readable media above, the computer readable medium is a non-transitory computer readable medium (e.g., RAM, ROM, CD-ROM, flash memory, etc.).

In another exemplary embodiment in accordance with this invention, an apparatus is provided for enabling cache read optimization for mobile memory devices. The apparatus includes means for receiving (e.g., a processor) one or more access commands, at a memory device from a host, the one or more access commands instructing the memory device to access at least two data blocks; means for accessing (e.g., a processor) the at least two data blocks; and means for generating (e.g., a processor), by the memory device, pre-fetch information for the at least two data blocks based at least in part on an order of accessing the at least two data blocks.

In a further exemplary embodiment of the apparatus above, the generating means is for generating the pre-fetch information based on information provided by the host, and/or rules in a controller for the memory device.

In another exemplary embodiment of any one of the apparatus above, each access command of the one or more access commands is associated with index information including a context identifier, a task tag, a pre-fetch identifier and/or a group number.

In a further exemplary embodiment of the apparatus above, the one or more access commands include a first access command and a second access command, and the first access command and the second access command include identical index information.

In another exemplary embodiment of the apparatus above, the receiving means includes means for receiving a first access command at a first time including first index information, means for receiving a second access command at a second time after the first time, where the second access command includes second index information which differs from the first index information, and means for receiving a third access command at a third time after the second time including the first index information.

In a further exemplary embodiment of the apparatus above, the generating means includes means for linking a last data block accessed in response to the first access command to a first data block accessed in response to the third access command.

In another exemplary embodiment of the apparatus above, the generating means includes means for starting a new linking data session for a first data block accessed in response to the third access command. Data blocks accessed in response to access commands having the same index information are linked during a linking data session.

In a further exemplary embodiment of the apparatus above, data blocks accessed in response to access commands having matching index information are linked during a linking data session, and the apparatus also includes means for starting a new linking data session in response to an elapse of a predetermined time after a previous access commands having the matching index information, an elapse of time after the linking data session was started, or a change in a control register.

In another exemplary embodiment of any one of the apparatus above, the generating means includes means for linking a first data block of the at least two data blocks to a next subsequently accessed data block of the at least two data blocks.

In a further exemplary embodiment of any one of the apparatus above, the one or more access commands include a read command and/or a write command.

In another exemplary embodiment of any one of the apparatus above, the pre-fetch information include instructions to pre-fetch at least two blocks when a first block is read.

In a further exemplary embodiment of any one of the apparatus above, the apparatus also includes means for receiving a first read command instructing the memory device to provide a first read data block to the host; means for providing the first read data block to the host; means for determining a subsequent read data block based on the pre-fetch information; means for pre-fetching the subsequent read data block; means for receiving, after pre-fetching the subsequent read data block, a second read command instructing the memory device to provide the subsequent read data block to the host; and means for providing the pre-fetched subsequent read data block to the host.

In another exemplary embodiment of the apparatus above, the apparatus also includes means for receiving a command to cease generating pre-fetch information for at least a portion of the memory device; and means for preventing generating pre-fetch information when accessing data blocks in the portion of the memory device.

In a further exemplary embodiment of the apparatus above, the apparatus also includes means for receiving one or more additional access command instructing the memory device to access one or more of the two or more data blocks; and means for removing the pre-fetch information based on an order of data blocks accessed in response to the one or more access commands.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., ID, TAG, etc.) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, by a memory device and from a host device, at least a first access command and a second access command, the first access command for instructing the memory device to access at least a first set of data blocks and the second access command for instructing the memory device to access at least a second set of data blocks that is different than the first set of data blocks, wherein the first set of data blocks and the second set of data blocks each comprises one or more data blocks and the first access command and the second access command each comprises identical index information; and
   generating, by the memory device and based at least in part on the identical index information, pre-fetch information for at least one of the one or more data blocks of the first set of data blocks or for at least one of the one or more data blocks of the second set of data blocks.

2. The method of claim 1, wherein the identical index information comprises at least one of: a context identifier, a task tag, a pre-fetch identifier, or a group number.

3. The method of claim 1, wherein the pre-fetch information comprises instructions to pre-fetch at least two data blocks from the first set of data blocks when one of the data blocks of the first set of data blocks is read.

4. The method of claim 1, further comprising generating, based at least in part on the identical index information, the pre-fetch information so that the pre-fetch information links a last data block of the first set of data blocks with a lead data block of the second set of data blocks.

5. The method of claim 1, further comprising:
   receiving an abort pre-fetch command from the host device; and
   stopping generating the pre-fetch information until a resume pre-fetch command is received from the host device.

6. The method of claim 1, further comprising:
   receiving a read command from the host device;
   providing at least one data block of the first set of data blocks to the host device in response to the reception of the read command;
   pre-fetching, based at least in part on the pre-fetch information, at least one data block of the second set of data blocks; and
   providing the at least one data block of the second set of data blocks to the host device.

7. The method of claim 1, wherein the first access command comprises a first write command, the second access command comprises a second write command, and the pre-fetch information defines a first order in which data blocks are to be accessed, the method further comprising:
   receiving a read command from the host device after the reception of the first write command, after the reception of the second write command, and after the generation of the pre-fetch information;
   determining, based at least in part on the read command, a second order in which data blocks are to be read, the second order differing from the first order; and
   modifying the pre-fetch information based at least in part on the second order in which the data blocks are to be read.

8. A memory device comprising:
   at least one controller operable to:
   receive, from a host device, at least a first access command and a second access command, the first access command for instructing the memory device to access at least a first set of data blocks and the second access command for instructing the memory device to access at least a second set of data blocks that is different than the first set of data blocks, wherein the first set of data blocks and the second set of data blocks each comprises one or more data blocks and the first access command and the second access command each comprises identical index information; and
   generate, based at least in part on the identical index information, pre-fetch information for at least one of the one or more data blocks of the first set of data blocks or for at least one of the one or more data blocks of the second set of data blocks.

9. The memory device of claim 8, wherein the at least one controller is further operable to:
   generate, based at least in part on the identical index information, the pre-fetch information so that the pre-fetch information links a last data block of the first set of data blocks with a lead data block of the second set of data blocks.

10. The memory device of claim 8, wherein the at least one controller is further operable to:
    receive a read command from the host device;
    provide at least one data block of the first set of data blocks to the host device in response to the reception of the read command;
    pre-fetch, based at least in part on the pre-fetch information, at least one data block of the second set of data blocks; and
    provide the at least one data block of the second set of data blocks to the host device.

11. The memory device of claim 8, wherein the first access command comprises a first write command, the second access command comprises a second write command, and the pre-fetch information defines a first order in which data blocks are to be accessed, and wherein the at least one controller is further operable to:
    receive a read command from the host device after the reception of the first write command, after the reception of the second write command, and after the generation of the pre-fetch information;
    determine, based at least in part on the read command, a second order in which the data blocks are to be read, the second order differing from the first order; and modify the pre-fetch information based at least in part on the second order in which the data blocks are to be read.

12. The memory device of claim 8, wherein the at least one controller is further operable to:
receive an abort pre-fetch command from the host device; and
stop generating the pre-fetch information until a resume pre-fetch command is received from the host device.

13. The memory device of claim 8, wherein the identical index information comprises at least one of: a context identifier, a task tag, a pre-fetch identifier, or a group number.

14. The memory device of claim 8, wherein the at least one controller is further operable to generate, based at least in part on the identical index information, pre-fetch information for at least one of the one or more data blocks of the first set of data blocks and for at least one of the one or more data blocks of the second set of data blocks.

15. One or more non-transitory computer readable media storing instructions that are executable by one or more processors to perform acts comprising:
receiving, from a host device, at least a first access command and a second access command, the first access command for instructing a memory device to access at least a first set of data blocks and the second access command for instructing the memory device to access at least a second set of data blocks that is different than the first set of data blocks, wherein the first set of data blocks and the second set of data blocks each comprises one or more data blocks and the first access command and the second access command each comprises identical index information; and
generating, based at least in part on the identical index information, pre-fetch information for at least one of the one or more data blocks of the first set of data blocks or for at least one of the one or more data blocks of the second set of data blocks.

16. The one or more non-transitory computer readable media of claim 15, wherein the acts further comprise generating, based at least in part on the identical index information, the pre-fetch information so that the pre-fetch information links a last data block of the first set of data blocks with a lead data block of the second set of data blocks.

17. The one or more non-transitory computer readable media of claim 15, wherein the acts further comprise:
receiving an abort pre-fetch command from the host device; and
stopping generating the pre-fetch information until a resume pre-fetch command is received from the host device.

18. The one or more non-transitory computer readable media of claim 15, wherein the acts further comprise:

receiving a read command from the host device;
providing at least one data block of the first set of data blocks to the host device in response to the reception of the read command;
pre-fetching, based at least in part on the pre-fetch information, at least one data block of the second set of data blocks; and
providing the at least one data block of the second set of data blocks to the host device.

19. The one or more non-transitory computer readable media of claim 15, wherein the first access command comprises a first write command, the second access command comprises a second write command, and the pre-fetch information defines a first order in which data blocks are to be accessed, and wherein the acts further comprise:
receiving a read command from the host device after the reception of the first write command, after the reception of the second write command, and after the generation of the pre-fetch information;
determining, based at least in part on the read command, a second order in which data blocks are to be read, the second order differing from the first order; and
modifying the pre-fetch information based at least in part on the second order in which the data blocks are to be read.

20. The one or more non-transitory computer readable media of claim 15, wherein the identical index information comprises at least one of: a context identifier, a task tag, a pre-fetch identifier, or a group number.

21. The one or more non-transitory computer readable media of claim 15, wherein the acts further comprise generating, based at least in part on the identical index information, pre-fetch information for at least one of the one or more data blocks of the first set of data blocks and for at least one of the one or more data blocks of the second set of data blocks.

22. A memory device comprising:
at least one controller operable to:
receive, from a host device, at least a first access command, the first access command for instructing the memory device to access at least a first set of data blocks, wherein the first set of data blocks comprises one or more data blocks; and
pre-fetch, based at least in part on pre-fetch linkage information for at least one of the one or more data blocks of the first set of data blocks, a data block from a second set of data blocks that are different than the first set of data blocks, the pre-fetch linkage information based at least in part on index information.

* * * * *